June 14, 1949.  J. BARONE  2,473,089
ANCHOR LEADER
Filed Aug. 22, 1944
Fig.1.
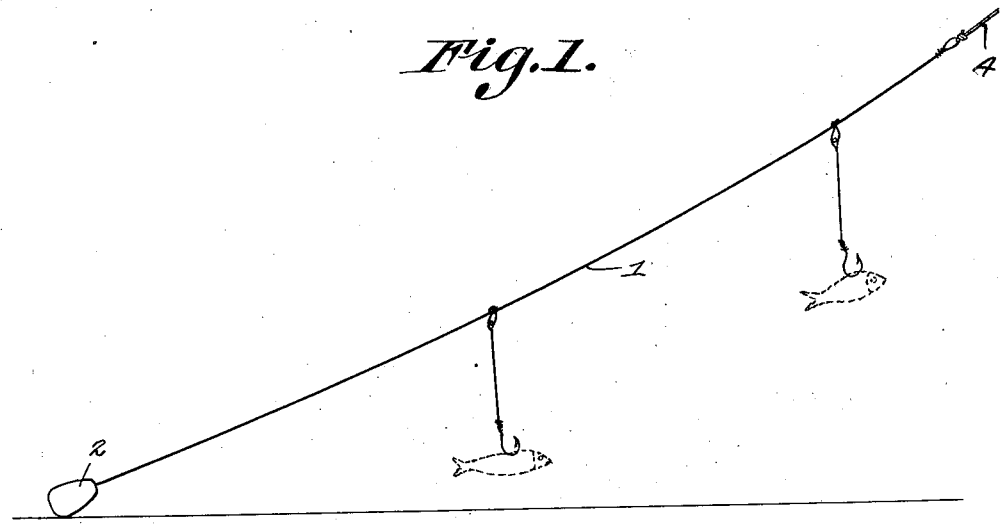
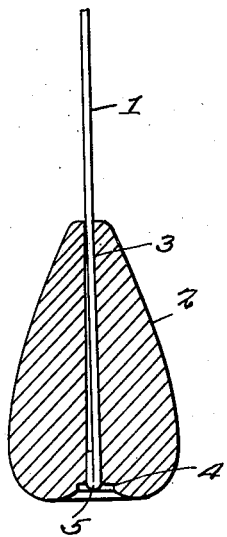
Fig.2.
J. Barone
INVENTOR.
BY CA Knowles
ATTORNEYS.

Patented June 14, 1949

2,473,089

UNITED STATES PATENT OFFICE 2,473,089

ANCHOR LEADER

James Barone, Alamosa, Colo.

Application August 22, 1944, Serial No. 550,645

1 Claim. (Cl. 43—52)

This invention relates to a leader for use by fishermen and more especially to a means whereby an anchor may be attached to the leader in such a manner as to allow the leader to be pulled free from the anchor should the anchor become caught in rocks or other objects in the water.

As a general rule the anchors are so attached to the leaders that, when they are hung on an obstruction in the water, they cannot be pulled free and, consequently, the leaders become broken.

An object of the present invention is so to attach the anchor that it will remain in engagement with the leader under ordinary fishing conditions but, when subjected to more than an ordinary pull, such as required in an effort to disengage the anchor from a rock or the like, the leader will pull away from the anchor so that another anchor can readily be substituted, without breakage of the leader or any part of the line.

With the foregoing and other objects in view which will appear as the description proceeds, the invention consists of certain novel steps in the method and certain details of construction and combinations of parts hereinafter more fully described and pointed out in the claim, it being understood that changes may be made in the method disclosed and in the construction and arrangement of parts without departing from the spirit of the invention as claimed.

In the accompanying drawing the preferred form of the invention has been shown.

In this drawing:

Figure 1 is an elevation of a fishing line to which is connected an anchor leader having an anchor joined thereto by means of the present invention.

Figure 2 is an enlarged section through the anchor and showing its connection with the leader.

Referring to the figures by characters of reference "A" designates a portion of a fishing line from which a leader 1 is extended. An anchor is shown at 2 and is formed of lead or other suitable soft material of requisite weight. In the present case it is substantially pear-shaped and has a central opening 3 extending longitudinally therethrough to a recess 4 formed in the large end of base of the anchor. The opening 3 can taper away from the recess 4 and at its small end it is of approximately the same diameter as the leader 1 so that the leader can be inserted thereinto, while at its larger end, it is in diameter approximately equal to the thickness of the leader when folded once upon itself. At all points, however, the opening is relatively small in diameter as compared to its length. After the leader has been threaded through the anchor, its free end can be folded as at 5 and the fold tucked back into the opening. The folded portion 5, as shown in Figure 2, is relatively short, since the end to end taper will, by reason of the particular construction of the opening described above, be very slight, and a longer fold would wedge into the opening too tightly to permit release of the leader from the anchor. By then pulling the anchor 2 a short distance along the leader, the folded portion 5 will become sufficiently tightly wedged in the anchor and thus hold the anchor to the leader under ordinary fishing conditions.

The leader is to be used in the ordinary way but should the anchor become caught on a rock or other obstruction on the bed of the stream or other body of water, more than an ordinary pull on the line will cause the leader to withdraw from the anchor due to the fact that the folded portion 5 will gradually wedge and ultimately unfold within the opening 3 to permit such withdrawal. Thus the fisherman is saved the cost of making replacement of the leader which otherwise would be broken or lost, and the only replacement necessary would be a new anchor which can be obtained at low cost.

What is claimed is:

The combination with a leader of an anchor having an opening extending from end to end thereof, the opening at all points being of comparatively small diameter relative to its length, the opening at one end being of a diameter approximately equal to the diameter of the leader, the opening at the other end being of a diameter approximately equal to double the thickness of the leader, said opening being formed with a slight taper extending from its smaller end to its larger end, the taper being coaxial throughout its length with the axis of the opening, and the leader being extended through the opening, and having one end folded back upon itself a short distance and retained in the larger end of the opening.

JAMES BARONE.

REFERENCES CITED

The following references are of record in the file of this patent:

UNITED STATES PATENTS

| Number | Name | Date |
| --- | --- | --- |
| 326,073 | Vosburgh | Sept. 8, 1885 |
| 327,073 | Vosburgh | Sept. 8, 1885 |
| 376,041 | Murdoch | Jan. 3, 1888 |
| 1,185,804 | Lane | June 6, 1916 |
| 1,564,147 | Stickley et al. | Dec. 1, 1925 |
| 1,823,412 | Schwarze | Sept. 15, 1931 |
| 2,140,724 | Stefan | Dec. 20, 1938 |
| 2,326,876 | Miller | Aug. 17, 1943 |

FOREIGN PATENTS

| Number | Country | Date |
| --- | --- | --- |
| 726,188 | France | Feb. 29, 1932 |